United States Patent
Villevieille

[19]

[11] Patent Number: 5,953,650
[45] Date of Patent: Sep. 14, 1999

[54] PORTABLE-MOBILE RADIOTELEPHONE ARCHITECTURE AND METHOD FOR MOBILE PERSONAL SECURITY SYSTEMS

[75] Inventor: Jean Marc Villevieille, Phoenix, Ariz.

[73] Assignee: Motorola Inc., Schaumburg, Ill.

[21] Appl. No.: 08/961,167

[22] Filed: Oct. 30, 1997

[51] Int. Cl.[6] .................................................. H04M 11/00
[52] U.S. Cl. ........................ 455/404; 455/521; 455/569
[58] Field of Search ................................... 455/404, 412, 455/433, 456, 457, 521, 90, 550, 569

[56] References Cited

U.S. PATENT DOCUMENTS

| | | | |
|---|---|---|---|
| 5,388,147 | 2/1995 | Grimes ..................................... | 455/404 |
| 5,555,448 | 9/1996 | Thiede et al. ............................. | 455/90 |
| 5,689,548 | 11/1997 | Maupin et al. ......................... | 455/404 |
| 5,740,532 | 4/1998 | Fernandez et al. ..................... | 455/404 |

*Primary Examiner*—Reinhard J. Eisenzopf
*Assistant Examiner*—Sam Bhattacharya
*Attorney, Agent, or Firm*—Nicholas C. Hopman

[57] ABSTRACT

A portable-mobile personal security system and method for a vehicle includes establishing a telephone call (407) from a portable radiotelephone (101) through a mobile radiotelephone (109). The telephone call established from the portable radiotelephone (101) is aborted (413) when a sensing device (119) indicates an emergency condition. Then, an emergency telephone call is made to an emergency-call center (415) through the mobile radiotelephone (109). While the emergency telephone call is in progress, a geographic position of the vehicle is transmitted to the emergency-call center (417). Additionally, a display (110) on the portable radiotelephone (101) displays status information about the emergency telephone call.

5 Claims, 5 Drawing Sheets

PORTABLE-MOBILE RADIOTELEPHONE ARCHITECTURE AND METHOD FOR MOBILE PERSONAL SECURITY SYSTEMS

FIELD OF THE INVENTION

This invention is related to the field of mobile personal security systems for use in vehicular applications.

BACKGROUND OF THE INVENTION

Contemporary mobile personal security systems include a position determining component—such as a Global Positioning System (GPS), and a radio communication sensing device—such as a cellular phone, to alert an emergency-call center of an emergency situation for a vehicle's operator. These mobile personal security system's can not only alert the emergency-call center with information concerning the nature of the emergency, but with the aid of the GPS, a position of the vehicle. This is convenient, because if a vehicle breaks down, or is in an accident, help can be send out to a precise location to remedy the emergency situation.

One problem with contemporary mobile personal security system's, is that they use mobile radiotelephones, that is, phones permanently installed in a vehicle. This is problematic because more and more people are using portable radiotelephones. Today, if someone wanted to have both a portable radiotelephone, and an mobile personal security system, that person would have two separate telephones and two separate telephone services, one used in the vehicle to operate the mobile personal security system, and one used to operate the portable radiotelephone. This is not only costly, but very inconvenient. Moreover, if the vehicle operator wanted to use the mobile radiotelephone's high power transceiver with his portable radiotelephone while in the vehicle, it will require redundant components including an antenna coupler, and a hands-free digital controller.

What is needed is an improved architecture for mobile personal security system's that includes provision for portable radiotelephones that is not complex and is cost-effective.

DETAILED DESCRIPTION OF A THE PREFERRED EMBODIMENT

A portable-mobile personal security system and method for a vehicle includes establishing a telephone call from a portable radiotelephone 101 through a mobile radiotelephone 109. The telephone call established from the portable radiotelephone 101 is aborted when a sensing device indicates an emergency condition. Then, an emergency telephone call is made to an emergency-call center 121 through the mobile radiotelephone 109. While the emergency telephone call is in progress, a geographic position of the vehicle is transmitted to the emergency-call center 121. Additionally, a display on the portable radiotelephone 101 displays status information about the emergency telephone call. The improved system and method will be better understood by reviewing the figures.

Figure 1:
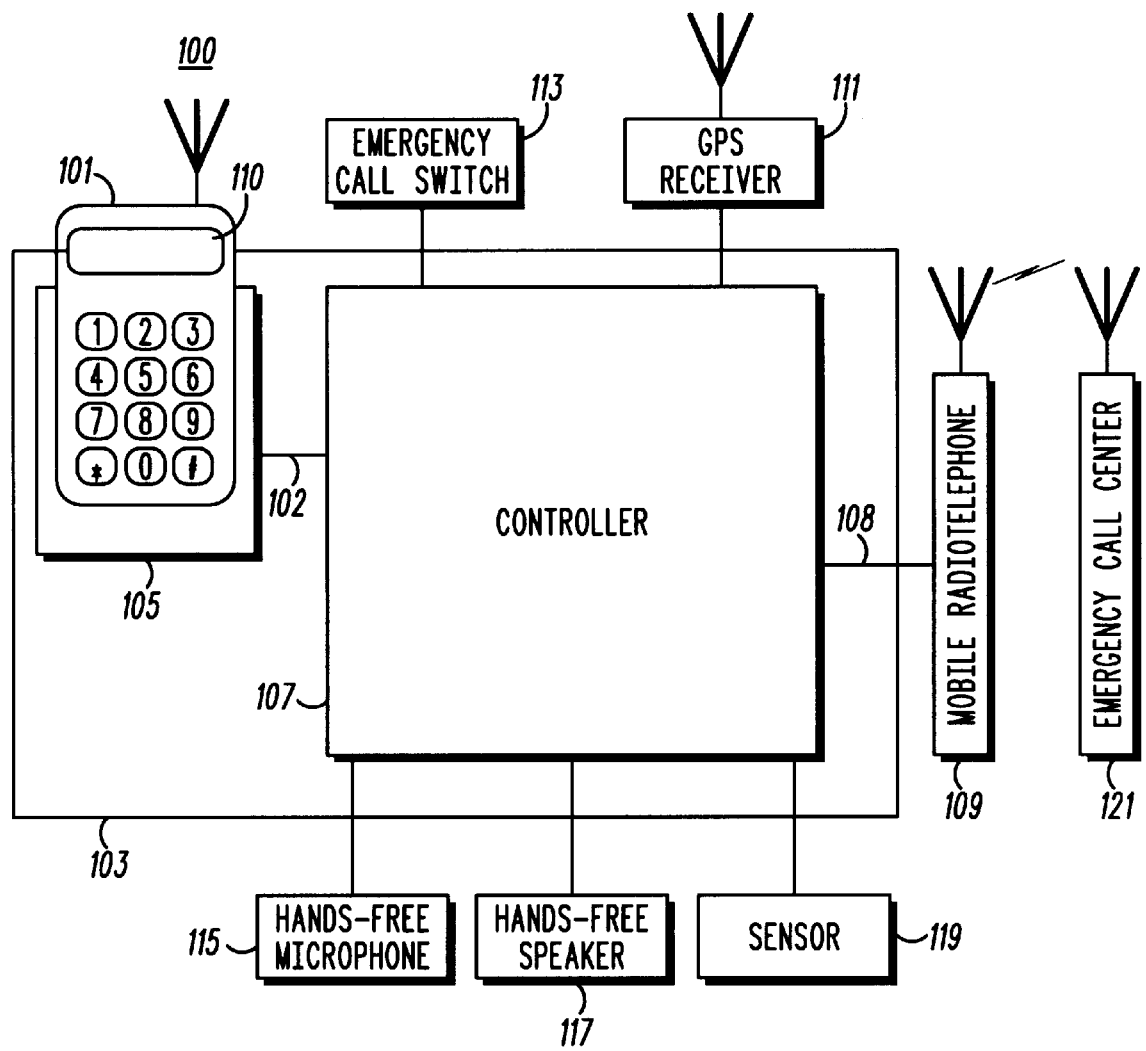
FIG. 1 is a system block diagram of a mobile personal security system in accordance with a preferred embodiment of the invention.

FIG. 1 is a system block diagram of a mobile personal security system 100 in accordance with a preferred embodiment of the invention. A portable radiotelephone 101 is coupled to an adapter 103. The adapter 103 consists of a cradle 105, for physically captivating the portable radiotelephone 101, and a controller 107 which connects to the portable radiotelephone 101 through the cradle 105. The cradle 105 had a switch that indicates whether or not the portable radiotelephone 101 resides in the cradle 105. The connection is made across a portable or P-data bus which transceives information between the portable radiotelephone 101 and a controller 107. Note that although the transfer of information between the portable radiotelephone 101 and the controller 107 is shown to occur over the P-data bus, other communication means could easily be implemented.

A mobile radiotelephone 109 is connected to the controller 107 using a mobile or M-data bus 108. The controller 107 is also connected to a GPS receiver 111, an emergency call switch 113, a hands-free microphone 115, a hands-free speaker 117, and a sensor 119. The sensor is used to indicate an emergency condition—such as a crash of the vehicle. An accelerometer can be used to sense and indicate a crash. Other types of sensors can also be used to indicate an emergency condition. For example a tire pressure sensor could sense and indicate a flat tire.

The controller 107 is preferably constructed comprising a Motorola MC68332 microcontroller 107. The Motorola MC68332 microcontroller 107 is programmed to execute the preferred method steps described later in the attached flow charts. Many other implementations are possible without departing from the essential teaching of this embodiment. For instance another microcontroller 107 could be used. Additionally, a dedicated hardware circuit based control system, controlled in accordance with the teachings of this treatise.

Positioning mechanisms other than the GPS receiver 111 may also be used to sense and indicate the vehicle's position. The vehicle's position is not required to be geographic, but merely indicative of an identifiable position.

Essentially, while the portable radiotelephone 101 is captivated in the cradle 105, the portable radiotelephone 101 is used as a peripheral to the mobile radiotelephone 109. The radio frequency transmission and reception components i.e. power amplifier and antenna, of the portable radiotelephone 101 are not used in the transmission and reception of a telephone call while the portable radiotelephone 101 is captivated in the cradle 105. A power amplifier, and antenna of the mobile radiotelephone 109 are used for the radio frequency transmission and reception of telephone calls while the portable radiotelephone 101 is captivated in the cradle 105. In this case the portable radiotelephone 101 is employed as the user interface in the personal security system 100. For instance the portable radiotelephone 101 is sometimes used for audio input and output, and provides the mobile personal security system with certain personality parameters, such as turbo-dial memory numbers, and billing-specific information if needed. When the portable radiotelephone 101 is removed from the cradle 105, the portable radiotelephone 101 uses it's own power amplifier and antenna components for radio frequency transmission and reception.

Four different applications will be described next; a hands-free telephone call using portable radiotelephone 101 inside the vehicle; an emergency call request; a hands-free telephone call interrupted by emergency call request; and a handset telephone call.

Figure 2:
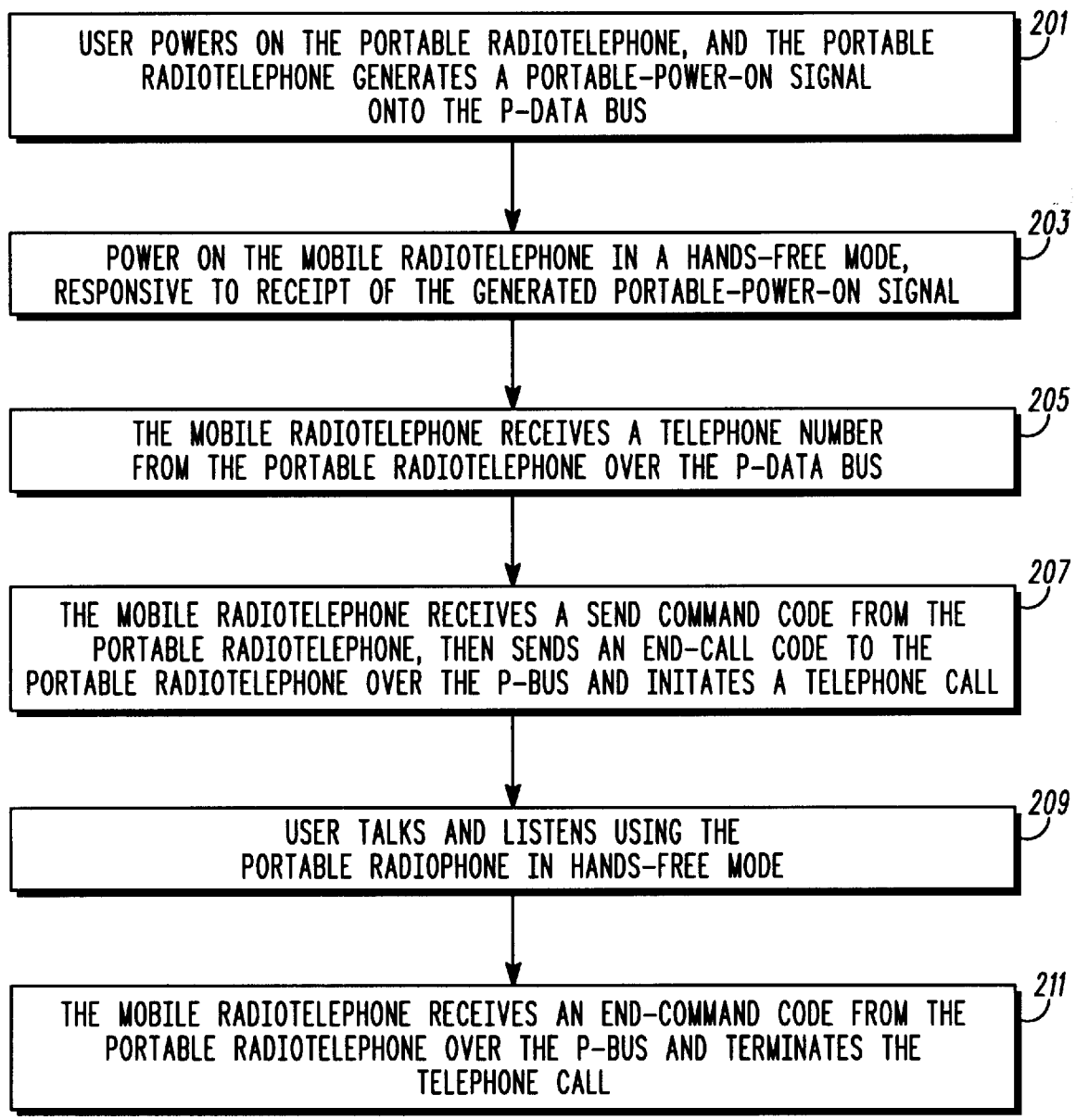
FIG. 2 is a flow chart of a method in accordance with one aspect of the preferred embodiment of the invention.

FIG. 2 shows a preferred method for operating the mobile personal security systems when the user makes a hands-free telephone call. The method steps shown in FIGS. 2–5 are preferably embedded into program memory of a Motorola MC68HC332 microcontroller 107 indigenous to the controller 107 introduced in FIG. 1. Alternatively, the method steps could be implemented on another type of controller 107.

The method is invoked in step 201 when the user powers-on the portable radiotelephone 101. When the user powers-on the portable radiotelephone 101 the portable radiotelephone 101 generates a portable-power-on signal onto the P-data bus 102.

The controller 107 intercepts the portable-power-on signal generated by the portable radiotelephone 101 from the P-data bus 102 and in-turn powers-on the mobile radiotelephone 109 into a hands-free mode via the M-data bus as shown in step 203.

After the user dials a telephone number on the portable radiotelephone 101 this information is transferred to the P-data bus 102 through the controller 107 through the M-data bus 108 to the mobile radiotelephone 109, as shown in step 205.

When the user presses a "SEND" Key on the portable radiotelephone 101 a send-call command code is transferred from the portable radiotelephone 101 over the P-data bus 102 through the controller 107 onto the M-data bus 108 to the mobile radiotelephone 109 which dials the telephone number as shown in step 207. Also in step 207, the controller 107 sends an end-call command code over the P-data bus 102 to the portable radiotelephone 101, which prevents the portable radiotelephone 101 from actually dialing the telephone number that the user entered into the portable radiotelephone 101. The portable radiotelephone 101 will still be used to display call status information on its visual display 110.

Next, step 209 illustrates that the user talks and listens as the user ordinarily would using the portable radiotelephone 101 in hands-free mode using the hands-free microphone 115 and the hands-free speaker 117, rather than the built-in microphone and speaker of the portable radiotelephone 101.

When the user wants to terminate the telephone call in-progress the user presses an "END" key on the portable radiotelephone 101 which in turn generates an end-command code which is transferred over the P-data bus 102 through the controller 107 by way of the M-data bus 108 to the mobile radiotelephone 109 to terminate the telephone call as shown in step 211. This completes the description of the first case, that of the user placing a hands-free telephone call.

As summary of the actions taken in the method steps shown in FIG. 2 are shown next in table form.

TABLE 1

| user's actions/ observations | mobile personal security system actions | portable radiotelephone status | mobile radiotelephone status |
| --- | --- | --- | --- |
| depress the portable radiotelephone "power-on" key | reads P-data bus | on | off |
| | turns mobile radiotelephone on in hands-free mode | on | on |
| dial a telephone number | reads numbers from P-data bus | dial | on |
| listen to the telephone call being placed via the hands-free speaker | echo numbers being dialed on M-data bus | dial | dial |
| depress the "send-call" key on the portable radiotelephone | reads send from P-data bus | send-call | dial |
| | send "end-call" command code to portable radiotelephone | terminate call | wait for send key |
| | send "send-call" command code to mobile radiotelephone | | send-call |
| hands-free call in progress | monitor both data bus portable radiotelephone and mobile radiotelephone | on - no radio frequency power | call |
| depress the "end" key on the portable radiotelephone | reads "end-call" command code from portable radiotelephone | | |
| listen to the telephone call being dropped via the hands-free speaker | sends "end-call" command code to mobile radiotelephone | | terminates call |

Figure 3:
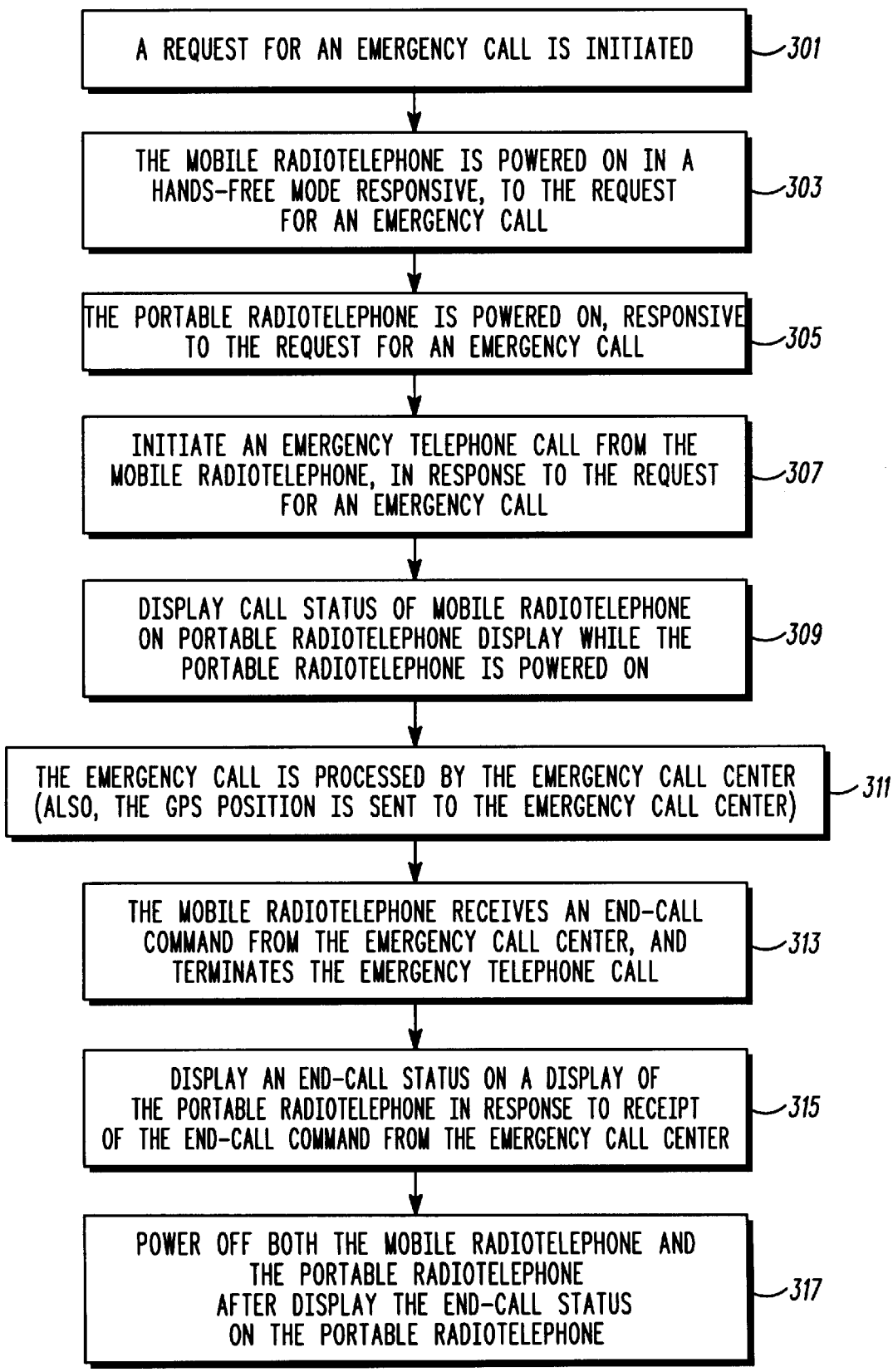
FIG. 3 is a flow chart of a method in accordance with a second aspect of with the preferred embodiment of the invention.

Next, an emergency call request will be described. FIG. 3 illustrates the preferred method for handling an emergency call request using the mobile personal security system. A request for an emergency call can be initiated by one of several methods. For instance, the vehicle mounted sensor 119 can sense a dangerous situation such as a crash of the vehicle. An emergency call can also be initiated directly by the user by activating the emergency call switch 113 when the user requires emergency assistance. This may happen for instance if the user who is operating the vehicle gets a flat tire.

In a first step of the preferred method 301, a request for an emergency call is initiated by one of the several methods described.

The controller 107 senses the request of an emergency call either by reading the emergency call switch 113, or reading data from the sensor 119, and powers-on the mobile radiotelephone 109 into hands free mode as shown in step 303.

Next, in step 305 the controller 107 powers-on the portable radiotelephone 101. Note that although that the portable radiotelephone 101 is powered-on its radio frequency power section is not enabled because it won't be used.

Then in step 307, the controller 107 commands the mobile radiotelephone 109 to initiate an emergency telephone call in response to the request for an emergency call. Note that the emergency call status is displayed on the portable radiotelephone 101 display 110.

Step 311 shows that the emergency call is processed by the emergency call center. This may include sending the vehicle's position information which is read from the GPS receiver 111 by the controller 107, and sent across the M-data bus 108 through the mobile radiotelephone 109 to the emergency call service center.

Next, in step 313 the mobile radiotelephone 109 receives an end-call command code from the emergency call center and terminates the emergency telephone call. At this time, the portable radiotelephone 101 displays an end-call status on its display 110, as shown in step 315.

Then, in step 317 the controller 107 powers-off both the mobile radiotelephone 109 and the portable radiotelephone 101 by sending the appropriate power-off commands through the M-data bus 108 and the P-data bus 102 respectively. This completes the description of the second case, that of an emergency call request.

As summary of the actions taken in the method steps shown in FIG. 3 are shown next in table form.

TABLE 2

| user's actions/ observations | mobile personal security system actions | portable radiotelephone status | mobile radiotelephone status |
|---|---|---|---|
| depress the emergency call switch | read emergency switch | off | off |
| | turns mobile radiotelephone on in hands-free mode | | on |
| | turn portable radiotelephone on | on - no radio frequency power | on |
| listen to call being placed hands-free | dials emergency number through M-data bus | | dial |
| monitor status call through portable radio- telephone display | send-call status information to portable radiotelephone display data bus | display call status | |
| | send "send-call" command code to mobile radiotelephone | | send-call |
| | monitor both data bus portable radiotelephone and mobile radiotelephone read "end-call" from modem emergency call center | | call |
| listen to call being dropped | send "end-call" command code to P-data bus & M-data bus | display "end-call" | terminates call |
| | turns mobile radiotelephone & portable radiotelphone off | off | off |

Next, a hands-free telephone call will be interrupted by an emergency call request.

Figure 4:
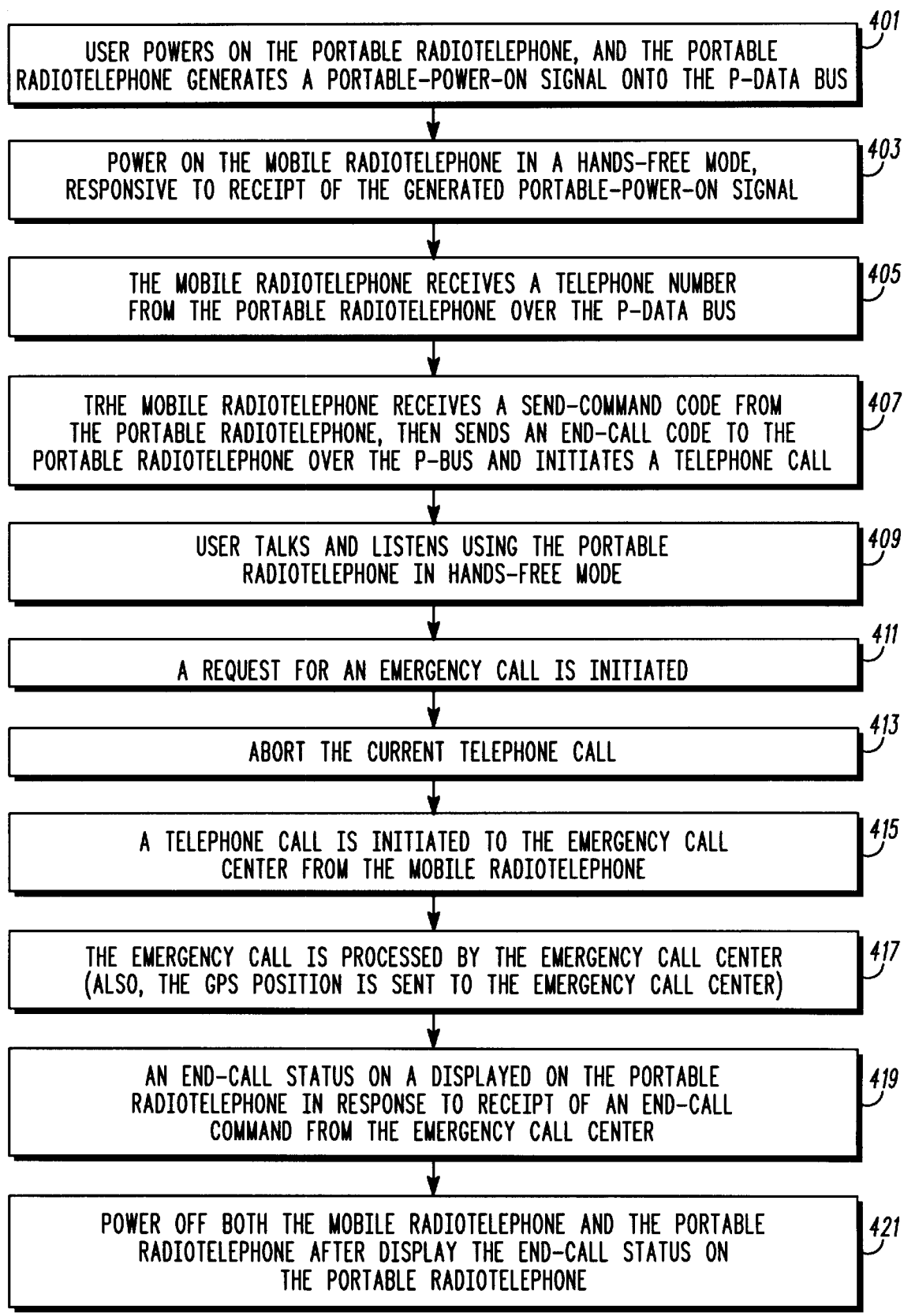
FIG. 4 is a flow chart of a method in accordance with a third aspect of with the preferred embodiment of the invention.

FIG. 4 shows a preferred method for operating the mobile personal security systems while the user is making a hands-free telephone call that gets interrupted by an emergency call request. In step 401 the user powers-on the portable radiotelephone 101 which generates a portable radiotelephone power-on signal onto the P-data bus 102.

Next, in step 403 controller 107 reads the portable radiotelephone power-on signal from the P-data bus and commands the mobile radiotelephone 109 to power-on in a hands-free mode by sending a command code over the M-data bus 108.

While the user dials a telephone number on the portable radiotelephone 101, this number is transferred over the P-data bus 102 through the controller 107, across the M-data bus 108, to the mobile radiotelephone 109, as shown in step 405.

Then, in step 407 the mobile radiotelephone 109 receives a send-call command code from the portable radiotelephone 101, and the controller 107 sends an end-call command code to the portable radiotelephone 101 via the P-data bus 102 while the mobile radiotelephone 109 initiates a telephone call.

Next, in step 409 the user talks and listens to his intended conversation using the portable radiotelephone 101 in hands-free mode.

Sometime during the ongoing telephone call, a request for an emergency call is initiated as shown in step 411. As noted earlier this request can be automatically generated by reading data from the sensor 119 or also initiated by the user if the user activates the emergency call switch 113, or alternatively by depressing a combination of two keystrokes on the portable phone, if a separate emergency call switch is not installed.

Next, as shown as step 413, the current telephone call is aborted by the controller 107 which sends an end-command code across the M-data bus 108 to the mobile radiotelephone 109 which in-TURN hangs up.

Next, in step 415 an emergency telephone call is initiated to the emergency call center from the mobile radiotelephone 109 under the command of the controller 107.

Once connected, the emergency call is processed by the emergency call center as shown in step 417. Optionally, the position of the vehicle which is determined by the GPS receiver 111 may be sent to the emergency call center.

Then, in step 119 when the emergency call is complete, the emergency call center terminates the call by sending an end-call command code to the mobile radiotelephone 109. Once the end-call command code is received by the mobile radiotelephone 109 it transfers it by way of the M-data bus 108, through the controller 107, onto the P-data bus 102, and the portable radiotelephone 101 displays the end-call status on its display 110.

Then, in step 421 the controller 107 powers-off both the mobile radiotelephone 109 and the portable radiotelephone 101.

As summary of the actions taken in the method steps shown in FIG. 4 are shown next in table form.

TABLE 3

| user's actions/ observations | mobile personal security system actions | portable radiotelephone status | mobile radiotelephone status |
|---|---|---|---|
| place a telephone call on portable radiotelephone | | on | on |
| hands-free call in process | | on | call |
| depress the emergency call switch | read emergency switch | on | call |
| observe call aborted | send "end" command code to mobile | display end-call on internal display | terminates call |

TABLE 3-continued

| user's actions/ observations | mobile personal security system actions | portable radiotelephone status | mobile radiotelephone status |
|---|---|---|---|
| listen to emergency call being placed hands-free monitor status call through portable radio- telephone display | radiotelephone dials emergency number through M-data bus | on - but no radio frequency power | dial |
| | send-call status information to portable radiotelephone display data bus | display call status on internal display | |
| | send "send-call" command code to mobile radiotelephone | | send-call |
| | monitor both data bus portable radiotelephone and mobile radiotelephone read "end-call" from modem emergency call center | | call |
| listen to call being dropped | send "end-call" command code to P-data bus & M-data bus | display "end-call" | terminates call |
| | turns mobile radiotelephone & portable radiotelehone off | off | off |

Figure 5:
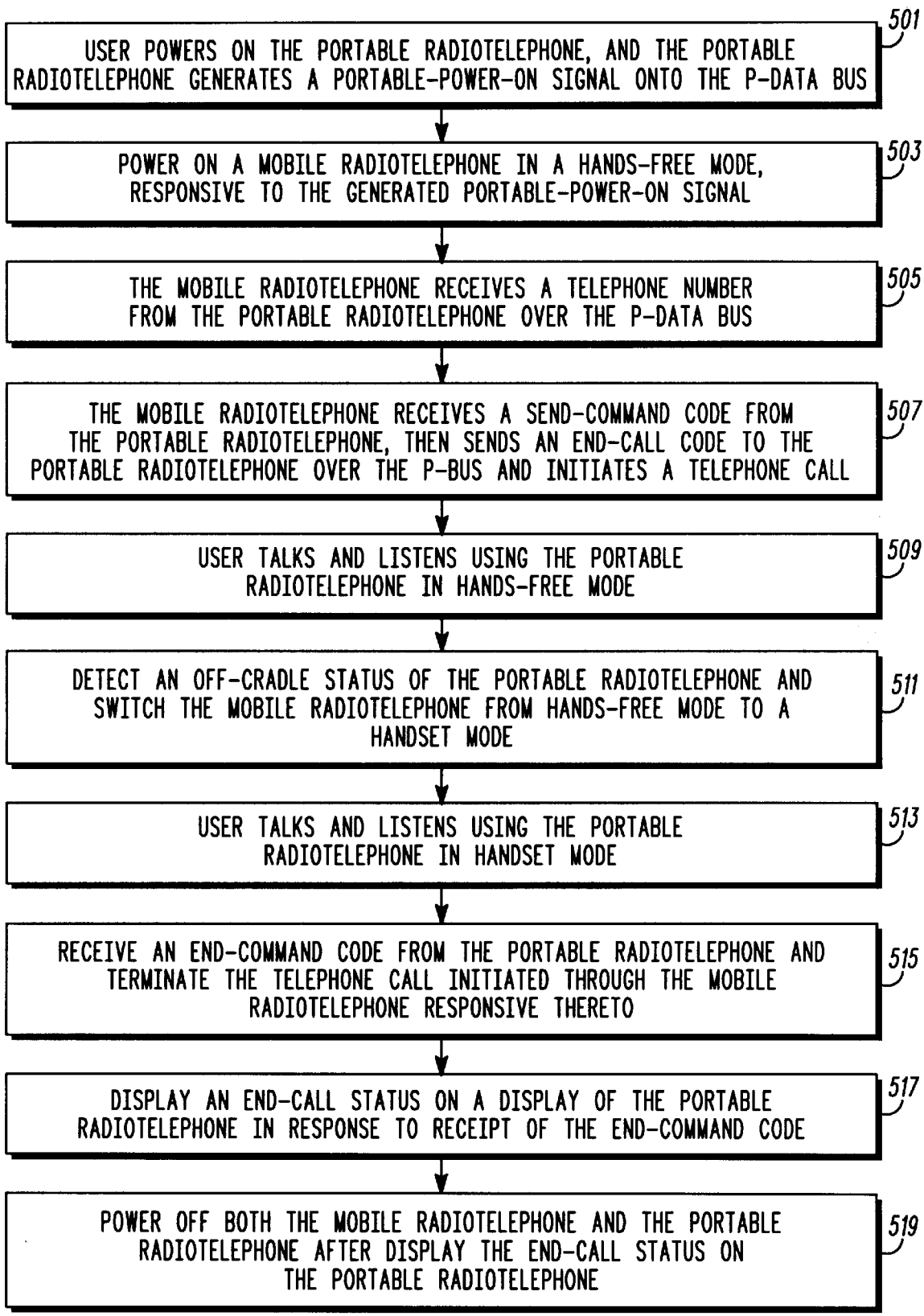
FIG. 5 is a flow chart of a method in accordance with a fourth aspect of with the preferred embodiment of the invention.

Next, a preferred method for the mobile personal security systems to handle a handset telephone call is described. FIG. 5 shows a preferred method for operating the mobile personal security systems while the user is making a handset telephone call. This means that the user wants to listen and talk using the speaker and microphone built into the portable radiotelephone, rather than in hands-free mode using the hands-free speaker 117 and hands-free microphone 115. Note that emergency calls are connected in hands-free mode for safety. If a handset telephone call is in progress, the mobile personal security system will abort the call and re-dial emergency number in hands-free mode as described earlier.

TABLE 4

| user's actions/ observations | mobile personal security system actions | portable radiotelephone status | mobile radiotelephone status |
|---|---|---|---|
| depress portable radiotelephone on key | reads P-data bus | on | off |
| | turns mobile radiotelephone on in hands-free mode | on | on |
| dial telephone number | reads numbers from P-data bus | dial | on |
| listen to call being placed hands-free | echo numbers being dialed on M-data bus | dial | dial |
| depress send key | reads "end-call" command code from P-data bus | send-call | dial |
| | send "end-call" command code to portable radiotelephone | terminate call | wait for "send-call" command code |

TABLE 4-continued

| user's actions/ observations | mobile personal security system actions | portable radiotelephone status | mobile radiotelephone status |
|---|---|---|---|
| | radiotelephone send "end-call" command code to mobile radiotelephone | | send-call |
| user picks up portable radio- telephone from its cradle but still linked to it by an extension cord | detects "off-cradle" switch | | |
| user talks and listens through the portable radiotelephone | send M-data bus to "handset" mode | | switch to no hands-free mode |
| | monitor both data bus portable radiotelephone and mobile radiotelephone | on - no radio frequency power audio available | |
| depress "end" key | reads "end-call" command code from portable radiotelephone | | |
| listen to call being dropped | sends "end-call" command code to mobile radiotelephone | | terminates call |
| user replaces portable radiotelephone in the cradle | detects "on-cradle" switch. re-route audio signals in standard config- uration mobile radiotelephone | | |

In step 501 the user powers-on the portable radiotelephone 101 and the portable radiotelephone 101 generates a portable radiotelephone power-on signal onto the P-data bus 102.

Next, in step 503 the controller 107 reads the portable radiotelephone power-on signal from the P-data bus and commands the mobile radiotelephone 109 to power-on in hands-free mode by sending a command code over the M-data bus 108.

While the user dials a telephone number on the portable radiotelephone 101 this number is transferred over the P-data bus 102, through the controller 107, across the M-data bus 108, to the mobile radiotelephone 109, as shown in step 505.

Then, in step 507 the mobile radiotelephone receives a send-call command code from the portable radiotelephone 101 then sends an end-call command code to the portable radiotelephone 101 and initiates a telephone call.

Next, in step 509 the user talks and listens to his intended conversation using the portable radiotelephone 101 in hands-free mode.

Next, in step 511 the controller 107 detects an off cradle status of the portable radiotelephone 101 when the user removes the portable radiotelephone 101 from the cradle 105, and switches the mobile radiotelephone 109 from a hands-free mode to a handset mode.

Step 513 shows the user talking and listening using the portable radiotelephone 101 in handset mode. When the user has completed his call the user presses the end switch on the portable radiotelephone 101, and an end-command code is sent from the portable radiotelephone 101 over the P-data bus 102, through the controller 107, and across the M-data bus 108, to the mobile radiotelephone 109 which receives the end-command code and terminates the current telephone call as shown in step 515.

Then, in step 517 an end-call status is displayed on the display 110 of the portable radiotelephone 101.

Next, the controller 107 powers off both the mobile radiotelephone 109 and the portable radiotelephone 101.

An improved architecture for a mobile personal security system and a corresponding method have been detailed above. This approach eliminates the need for an antenna coupler, and a hands-free digital controller. Furthermore, this approach is convenient for a user because the user can not only use their portable radiotelephone with their mobile personal security system, which allows the user to take advantage of the power output and antenna system from the mobile radiotelephone, but also as a portable radiotelephone away from their vehicle. Furthermore, the portable unit keeps all personal numbers including turbo-dial numbers which spares the burden of reprogramming the second mobile unit with potentially up to 99 pre-recorded numbers.

What is claimed is:

1. A portable-mobile radiotelephone personal security method for a vehicle comprising the steps of:
   powering-on a portable radiotelephone, and generating a portable-power-on signal responsive thereto;
   powering-on a mobile radiotelephone in a hands-free mode responsive to the generated portable-power-on signal;
   receiving a telephone number from the portable radiotelephone;
   receiving a send-call command code from the portable radiotelephone, then sending an end-call command code from the mobile radiotelephone to the portable radiotelephone and initiating a telephone call from the mobile radiotelephone;
   initiating a request for an emergency call;
   aborting the initiated call when a sensing device indicates an emergency condition;
   intiating an emergency telephone call to an emergency-call center from the mobile radiotelephone in response to the request for an emergency call; and
   receiving an end-command code from the portable radiotelephone and terminating the telephone call initiated through the mobile radiotelephone responsive thereto.

2. A portable-mobile radiotelephone personal security method for a vehicle comprising the steps of:
   powering-on a portable radiotelephone, and generating a portable-power-on signal responsive thereto;
   powering-on a mobile radiotelephone in a hands-free mode responsive to the generated portable-power-on signal;
   receiving a telephone number from the portable radiotelephone;
   receiving a send-call command code from the portable radiotelephone, then sending an end-call command code from the mobile radiotelephone to the portable radiotelephone and initiating a telephone call from the mobile radiotelephone;
   initiating a request for an emergency call;
   aborting the initiated telephone call when a sensing device indicates an emergency condition;
   initiating an emergency telephone call to an emergency-call center from the mobile radiotelephone in response to the request for an emergency call;
   receiving an end-call command code from the emergency call center, and terminating the initiated emergency telephone call responsive thereto; and
   powering-off both the mobile radiotelephone and the portable radiotelephone after displaying the end-call status on the portable radiotelephone.

3. A method in accordance with claim 2 further comprising a step of:
   transmitting a position of the vehicle to the emergency-call center.

4. A method in accordance with claim 3 further comprising a step of:
   displaying status information about the emergency telephone call on a display on the portable radiotelephone.

5. A portable-mobile radiotelephone personal security method for a vehicle comprising the steps of:
   powering-on a portable radiotelephone, and generating a portable-power-on signal responsive thereto;
   powering-on a mobile radiotelephone in a hands-free mode responsive to the generated portable-power-on signal;
   receiving a telephone number from the portable radiotelephone;
   receiving a send-call command code from the portable radiotelephone, then sending an end-call command code from the mobile radiotelephone to the portable radiotelephone and initiating a telephone call from the mobile radiotelephone in response to receiving a send-call command code;
   detecting an off-cradle status of the portable radiotelephone and switching the mobile radiotelephone from hands-free mode to a handset mode;
   receiving an end-command code from the portable radiotelephone and terminating the telephone call initiated through the mobile radiotelephone responsive thereto; and
   displaying an end-call status on a display of the portable radiotelephone in response to receipt of the end-command code; and
   powering-off both the mobile radiotelephone and the portable radiotelephone after displaying the end-call status on the portable radiotelephone.

* * * * *